United States Patent [19]

Bourdon et al.

[11] 4,068,653

[45] Jan. 17, 1978

[54] SOLAR HEATING UNIT

[75] Inventors: Leo Bourdon; Richard K. Burley, both of Reseda; Clifford F. Kennedy, Thousand Oaks, all of Calif.

[73] Assignees: Leo Bourdon; Richard K. Burley; Clifford F. Kennedy

[21] Appl. No.: 662,679

[22] Filed: Mar. 1, 1976

[51] Int. Cl.² ............................................... F24J 3/02
[52] U.S. Cl. ................................... 126/271; 126/270; 350/288; 350/299
[58] Field of Search ............... 126/270, 271; 350/299, 350/288; 237/1 A

[56] References Cited

U.S. PATENT DOCUMENTS

| 1,814,897 | 7/1931 | Coxe | 126/270 |
| 2,945,417 | 7/1960 | Caryl et al. | 126/270 |
| 2,976,533 | 3/1961 | Salisbury | 126/270 |
| 3,182,654 | 5/1965 | Culling | 126/270 |
| 3,227,153 | 1/1966 | Godel et al. | 126/271 |
| 3,868,823 | 3/1975 | Russell, Jr. et al. | 126/270 |
| 3,985,119 | 10/1976 | Oakes, Jr. | 126/271 |
| 3,991,741 | 11/1976 | Northrup, Jr. et al. | 126/271 |
| 4,000,734 | 1/1977 | Matlock et al. | 126/271 |

*Primary Examiner*—Kenneth W. Sprague
*Assistant Examiner*—James C. Yeung
*Attorney, Agent, or Firm*—Warren T. Jessup

[57] ABSTRACT

An apparatus for collecting the heat from solar energy for use in heating applications such as swimming pools. The apparatus is comprised of a panel having three separately movable structures, each rotatably independent of each other in order to provide a maximum amount of rotation in a relatively compact area. The apparatus is constructed of a plurality of rotatable carriers and frames mounted on vertical legs or posts which are supported on a movable base. A main frame or carriage is rotatably supported on axles attached to the vertical legs. A pair of smaller frames are rotatably supported on each end of the main carriage. The two rotatable frames have a plurality of conduits or pipes for circulating a fluid each at the focal point of a magnifying lens to collect the heat energy of the sun. These frames or panels are maintained parallel to each other and perpendicular to the sun by the output of electronic circuitry which operates a motor to rotate the main carriage which in turn causes the smaller frames having the fluid circulating conduits to simultaneously rotate. A pair of photocells which are attached to the lens structure detect the direction of the sun's rays and cause the main carriage to rotate whenever the illumination from the sun is greater on one photocell than the other. A third photocell energizes the system when the early sunlight exceeds a predetermined minimum causing the system to seek and track the sun during the day and to turn the system off in the evening when the sun's rays fall below the predetermined minimum and return the structure to the morning position ready for sunrise.

12 Claims, 12 Drawing Figures

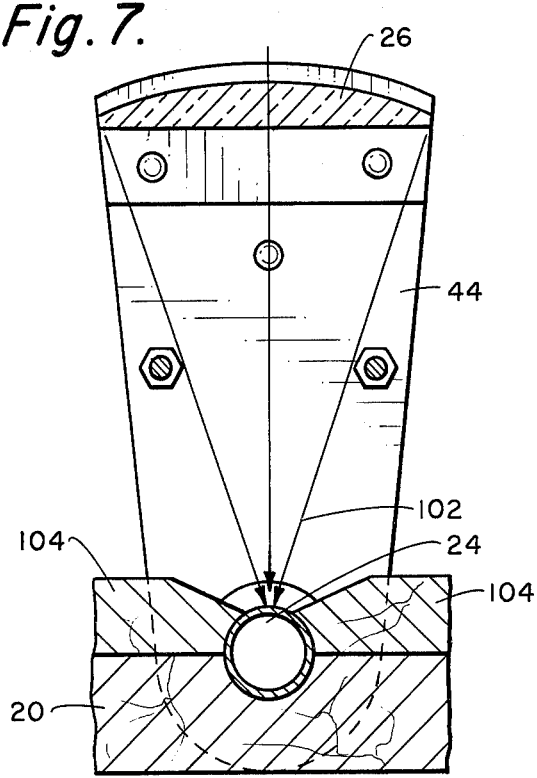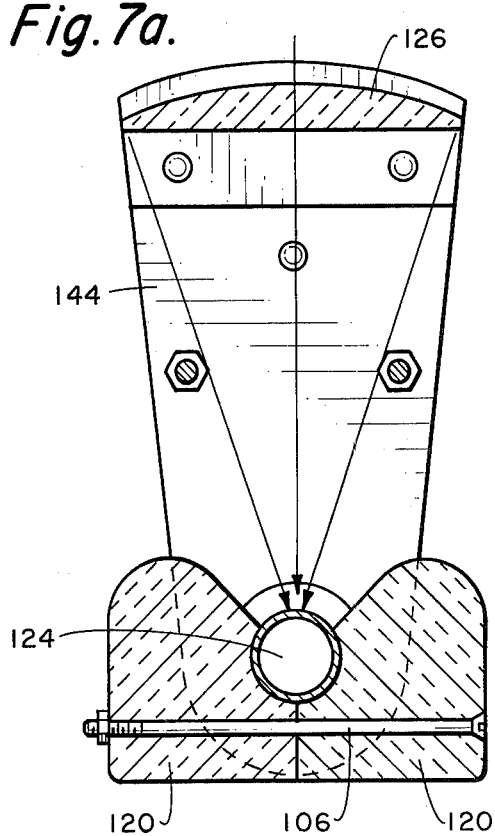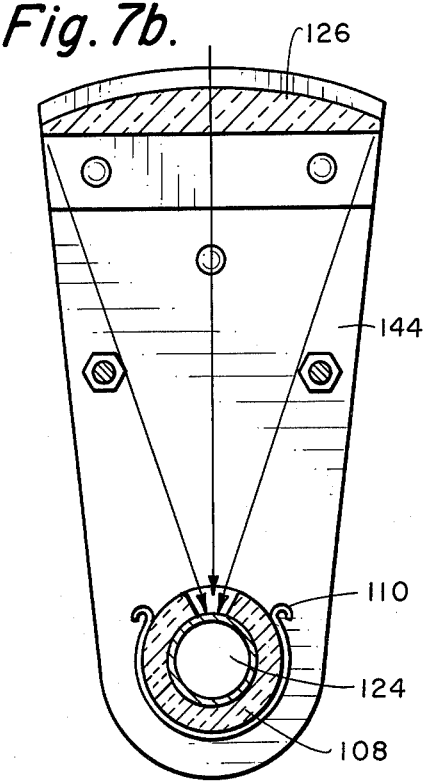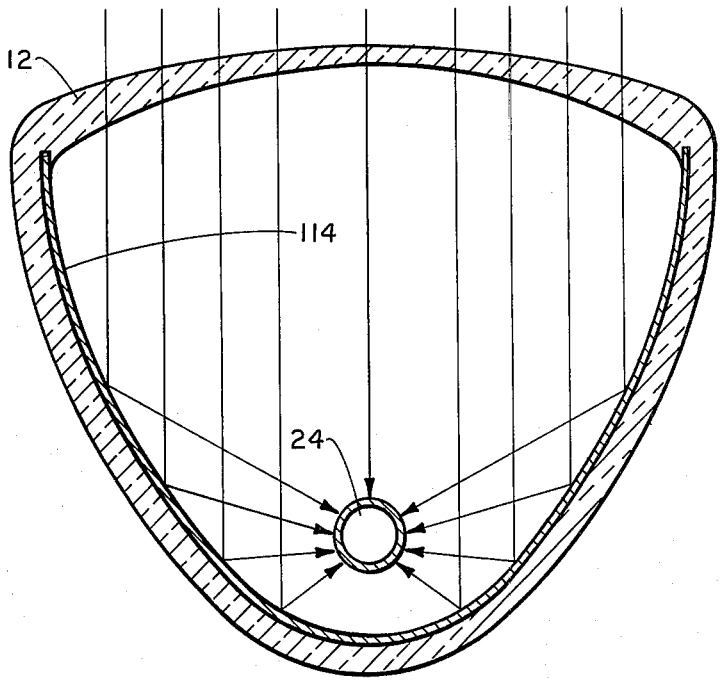

SOLAR HEATING UNIT

BACKGROUND OF THE INVENTION

This invention relates generally to devices for collecting solar energy and more particularly relates to devices for tracking the sun to collect the maximum solar energy for converting it to heating purposes. There are presently numerous devices available in the art for tracking the sun called heliostats for concentration of the sun's rays on an object to be activated thereby, such as photovoltaic semi-conductor devices normally known as solar cells. There are also devices known for collecting the heat from solar energy in a fluid for conversion to heat houses, structures, swimming pools, and the like. These latter devices are generally in the form of large panels having numerous pipes for circulating water which are in the direct path of the sun's rays. Some of the devices are laid out on the roof of a house or a patio cover and cover a relatively large surface area to collect as much of the solar energy as possible. Most of these devices are relatively inefficient because a black body raised to higher temperature than ambient reradiates the heat back to the atmosphere before it can be stored in an insulated tank in the form of a circulating fluid that has been warmed by passing through the black body.

It has been proposed by one prior art system to concentrate the sun's energy on a fluid containing pipe in order to collect the maximum amount of solar energy. This proposal, however, contemplates concentrating the energy on the fluid by adjusting mirrors which reflect the sunlight on the fluid conduit. This device keeps the pipe circulating the fluid stationary while adjusting mirrors in relation to the sun's rays to concentrate the sun's rays on the pipe containing the fluid. A disadvantage of this type of device is that a single small section of pipe containing fluid requires a large number of mirrors to concentrate sufficient solar energy on it.

SUMMARY OF THE INVENTION

The purpose of the present invention is to provide a solar heating device which can collect as much energy as possible while maintaining the barrel lens perpendicular to the sun's rays for 120° of rotation. This invention makes use of the fact that for each hour of the day during sunlight a given surface of a unit area in clear weather will receive a given amount of heat energy from the sun. The amount of energy, of course, will vary with the one time of day, the seasons of the year, the degree of haze, smog, or clouds, and the degree in which our universe is kept perpendicular to the sun's rays over the period when the sun is shining. At any point in time, depending upon the above conditions, the unit area will receive some maximum amount of energy in the form of heat and light. The amount of heat received can be measured in calories or in British thermal units (BTU).

This invention is comprised of a plurality of rotatably mounted panels which circulate a large amount of fluid and have means for concentrating the solar energy on the fluid circulating pipes. A plurality of fluid circulating pipes are mounted in a planar frame with two or more frames rotatably mounted to be kept parallel with each other. Mounted on the frames are lens for concentrating solar energy on each section of pipe in the frame. The lens focus on the heat collecting tube in a line, each tube being insulated 270° of its 360° peripheral surface, thus minimizing reradiation heat losses. These lens are mounted for rotation with the frame to maintain the sun's rays normal to the plane of each section of conduit at all times. In order to get the maximum amount of rotation in the smallest space, the frames are mounted on a rotatable carriage which is supported on a pair of vertical legs. The legs are mounted on an angularly rotatable base in order to further maintain the entire system normal to the sun's rays throughout the seasons.

When tracking the sun with a lens, the position of the lens must be go arranged that it will focus on the surface of a tube and be parallel to the axis of the tube. In this invention we have arranged an array of lens on a compound trunnion system. The system is a series of trunnion panels in which the first trunnion panel can move plus or minus 20° in reference to ground plane. Two or more panels are then trunnioned from the first panel and these panels can also trunnion in reference to the first panel, plus or minus 20°. These panels can be referred to as the "mid-panels." Mounted on each of these mid-panels are a series of lens panels. These lens panels are so arranged that they trunnion in position to the mid-panels. Thus we have a system of compound panels in a series.

In order to track the sun through 120° of earth rotation, the first panel is trunnioned for 40° of rotation from one extreme to the other. While the first or ground panel is moving 40°, the mid-panels are mounted for rotation in reference to the first panel, also 40°, but in reference to the ground 80°. Simultaneously with the movement of the ground panel and midpanels, we move the lens panels which are supported on the mid-panels which also may move 40° in relation to the mid-panel and a total of 120° with relation to the ground. Therefore, as the first panel rotates 40°, the mid-panel rotates 40°, and the lens panels rotate 40°, which results in a total of 120° rotation in reference to the ground.

An electronic nulling circuit having a pair of photocells moving in unison with the barrel lens and by detecting the direction of the sun's rays energizes a motor attached to the main carriage for incrementally tracking the carriage in response to movement of the sun throughout the day. The pair of photocells for detecting the angle of the sunlight are mounted on one of the lens frames. As the sun moves, an imbalance is created on the photocells causing the circuit to energize the motor which in turn begins to rotate the carriage. As the magnitude of light on the two photocells equalizes, the circuit achieves a null point, turning off the motor which in turn stops the carriage. The motor is geared to the carriage to provide constant tracking of the sun's rays.

A third photocell in the circuit detects the first light in the morning and energizes a circuit causing the system to begin tracking the sunlight. The circuit has a threshold setting for the light detecting photocell in order to maintain the system in an off mode until the sunlight reaches the required degree. When the sunlight exceeds the threshold, the photocell initiates the tracking sequence and the lens panels are rotated to maintain the sun's rays in a tangent line on the surface of the pipes through which the heat collecting fluid is flowing. The fluid is pumped through the system at a rate which collects the heat. When first turned on, the system begins tracking the sun and water or other suitable fluid begins to flow in the pipes. The solar energy is focused in a line on the pipes through a plurality of barrel lenses and begins to heat the fluid. When the sun moves creating an imbalance on a pair of photocells, the motor attached to the carriage is energized, repositioning the system normal to the sun's rays. During this time fluid is constantly being circulated through the panels to a storage tank for collecting the heat or directly into a swimming pool, if desired.

The lens system may be a barrel-type lens for concentrating energy in a line on the pipes or conduits. The lens system and fluid conducting system also include an insulator enclosing a substantial portion of the circumference of the pipes. The lens may be a window of an evacuated envelope having an inside mirrored surface which completely encloses the fluid circulating pipe section. The main object is to concentrate the maximum amount of energy on the minimum area of a fluid circulating pipe while maintaining the entire system normal to the sun's rays.

It is one object of the present invention to provide a solar heating panel which maintains the heat collecting portion perpendicular to the sun's rays at all times.

Another object of the present invention is to provide a solar heat collecting system which can automatically track the sun.

Still another object of the present invention is to provide a solar heat collecting system which operates automatically from dawn until dusk.

Still another object of the present invention is to provide a solar heat collecting system which automatically begins operating when solar energy exceeds a predetermined minimum.

Yet another object of the present invention is to provide a solar heat collecting system which provides the maximum amount of collecting surface in a minimum amount of area.

Other objects, advantages and novel features of the invention become apparent from the following detailed description of the invention when considered in conjunction with the accompanying drawings wherein like reference numbers identify like parts throughout.

BRIEF DESCRIPTION OF THE DRAWINGS

FIGS. 7a through 7c are variations of lens and insulation arrangement for the configuration shown in FIG. 7.

DETAILED DESCRIPTION OF THE PREFERRED EMBODIMENT

The primary purpose of the solar heat collecting system is to convert the solar energy from the sun into heat in the most efficient manner. To achieve this the maximum amount of area must be presented to the highest concentration of solar energy. To obtain the maximum concentration of solar energy the most efficient angle is 90°, for maintaining the heat collecting system normal or perpendicular to the sun's rays. The more the sun's rays depart from normal, the larger portion which is reflected back into space creating a loss of solar energy. Thus, for maximum efficiency any solar heat collecting system should be kept normal to the sun's rays. However, since a large surface area must be kept parallel to the sun's rays which traverse an angle from dawn to dusk of nearly 180°, an extremely gigantic system would have to be built, unless there is some way of achieving this rotation in a relatively small area. To do this a plurality (at least two) of panels are rotatably mounted so that they may track the sun while remaining parallel but in turn maintaining them such that neither is ever in the shadow of the other. In addition to the sun traversing 180° during the day, the ecliptic or angle of the sun from season to season varies annually aproximately 47° area; thus this wide angle must also be taken into consideration.

Figure 1:
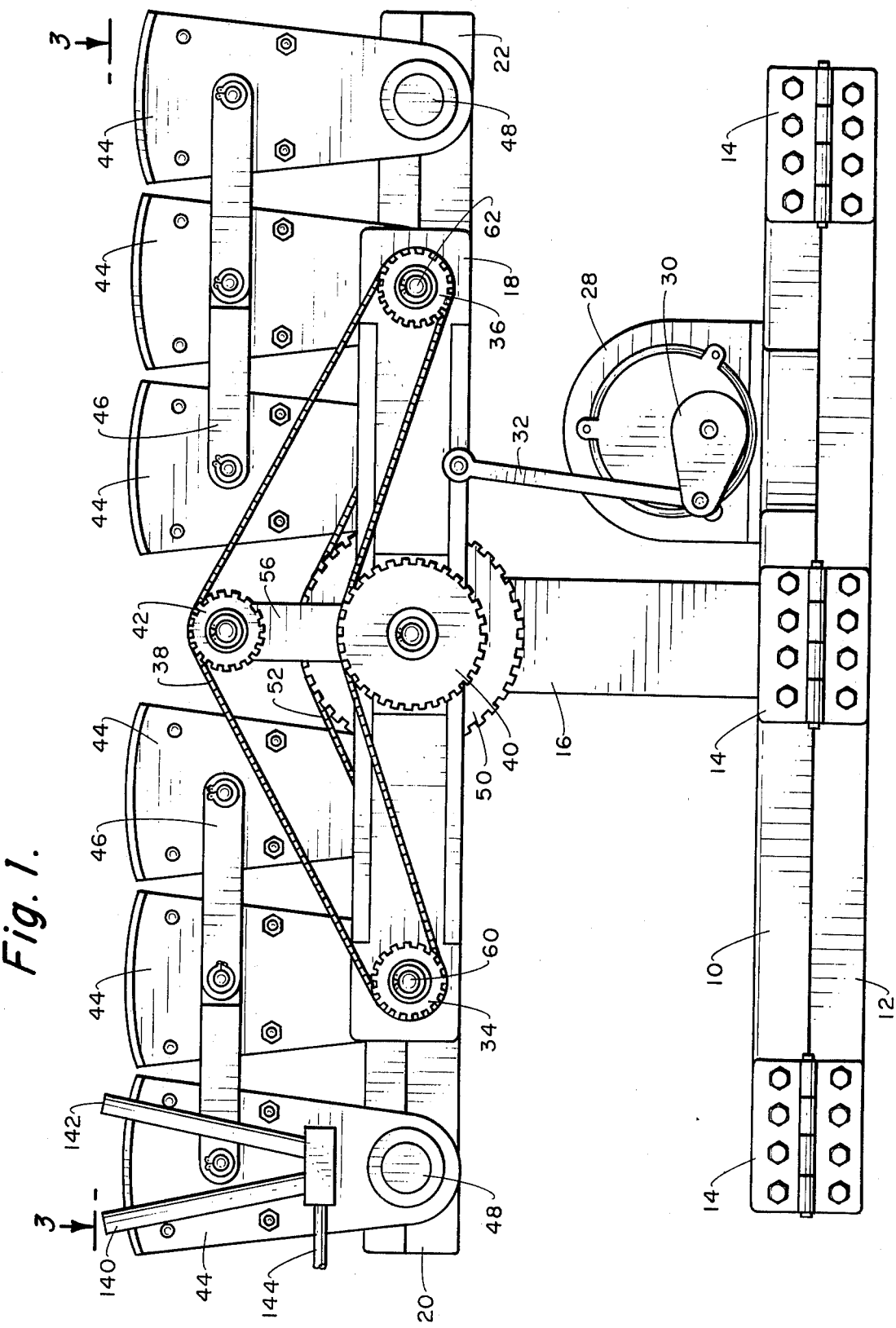
FIG. 1 is a side elevation of the solar heat collecting system.

In order to achieve this maximum amount of collecting efficiency, a system such as is shown in FIG. 1 was conceived. This system consists of a base 10 which can be raised or lowered at an angle as one portion is connected to a pad 12 by a plurality of hinges 14. Mounted on the base 10 are a pair of legs 16 which support a main rotatable carriage 18. At each end of the carriage are mounted identical rotatable rectangular frames or panels 20 and 22. Each panel 20 and 22 has a plurality of fluid circulating pipes 24 mounted parallel to each other for circulating a fluid. A lens 26 associated with each section of pipe 24 concentrates the solar energy on predetermined sections of the pipe.

Adjustment of the solar heating system is accomplished by a motor 28 attached to carriage 18 by a bell crank 30 and bell crank arm 32. Rotation of the bell crank 30 causes the arm 32 to oscillate thus rocking the carriage 18 from one side to the other. The frames or panels 20 and 22 are automatically rotated through a gear and bell drive system comprised of pulley gears 34 and 36 and belt 38. A stationary gear 40 mounted on the support post 16 drives the belt 38 whenever the carriage 18 is rocked to one side or the other. The belt 38 also engages an idler pulley 42.

The lens 26 are rotatably mounted on lens support arms 44 which are interlinked by movable links 46 so that movement of one support arm 44 results in movement of all three arms mounted on one of the frames 20 and 22. Each lens support plate 44 is rotatably mounted on a shaft 48. Angular movement of the lens is accomplished through a stationary gear pulley 50 engaging a second belt 52 which engages a rotatable pulley 54 which can best be seen in FIG. 5.

Figure 2:
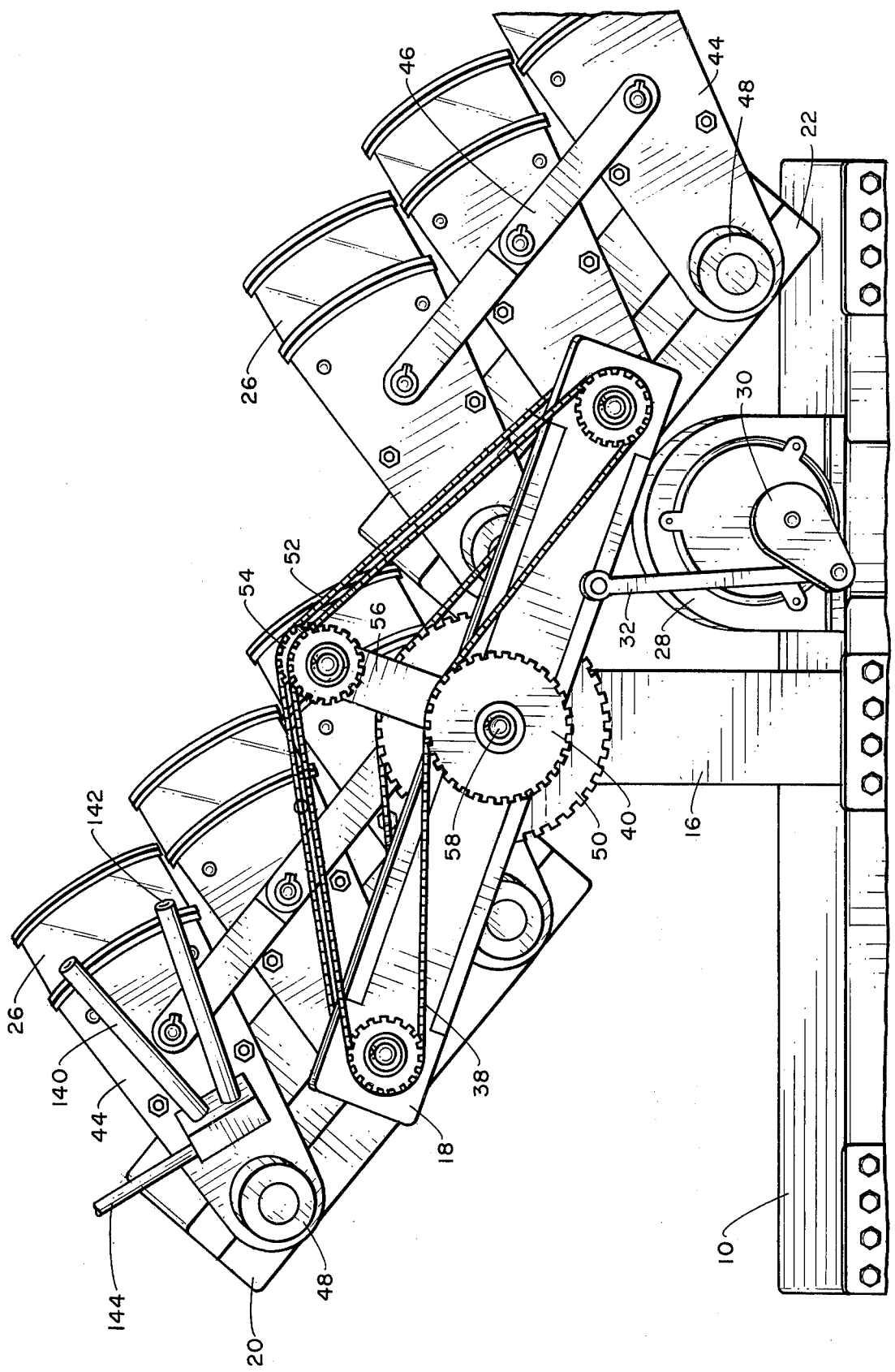
FIG. 2 is a perspective view of the solar heating system illustrating rotation of the frames.

The system is shown in a rotated position in FIG. 2. For each degree of movement of the carriage 18, the frames or panels 20 and 22 and the lens 26 also rotate an equal amount. Thus a 20° rotation of the carriage 18 results in a net 60° total rotation by the net 20° rotation of the panels 20 and 22 and the lens 26. In FIG. 2 the base panel has been slightly raised at an angle out of the plane of the view in order to provide a perspective view of the assembly. Note that belt 52 also passes over an idler pulley 54 on the opposite side of arm 56 from idler pulley 42. The carriage 18 rotates on a spindle 58 to which the stationary pulleys 40 and 50 are rigidly attached.

Figure 3:
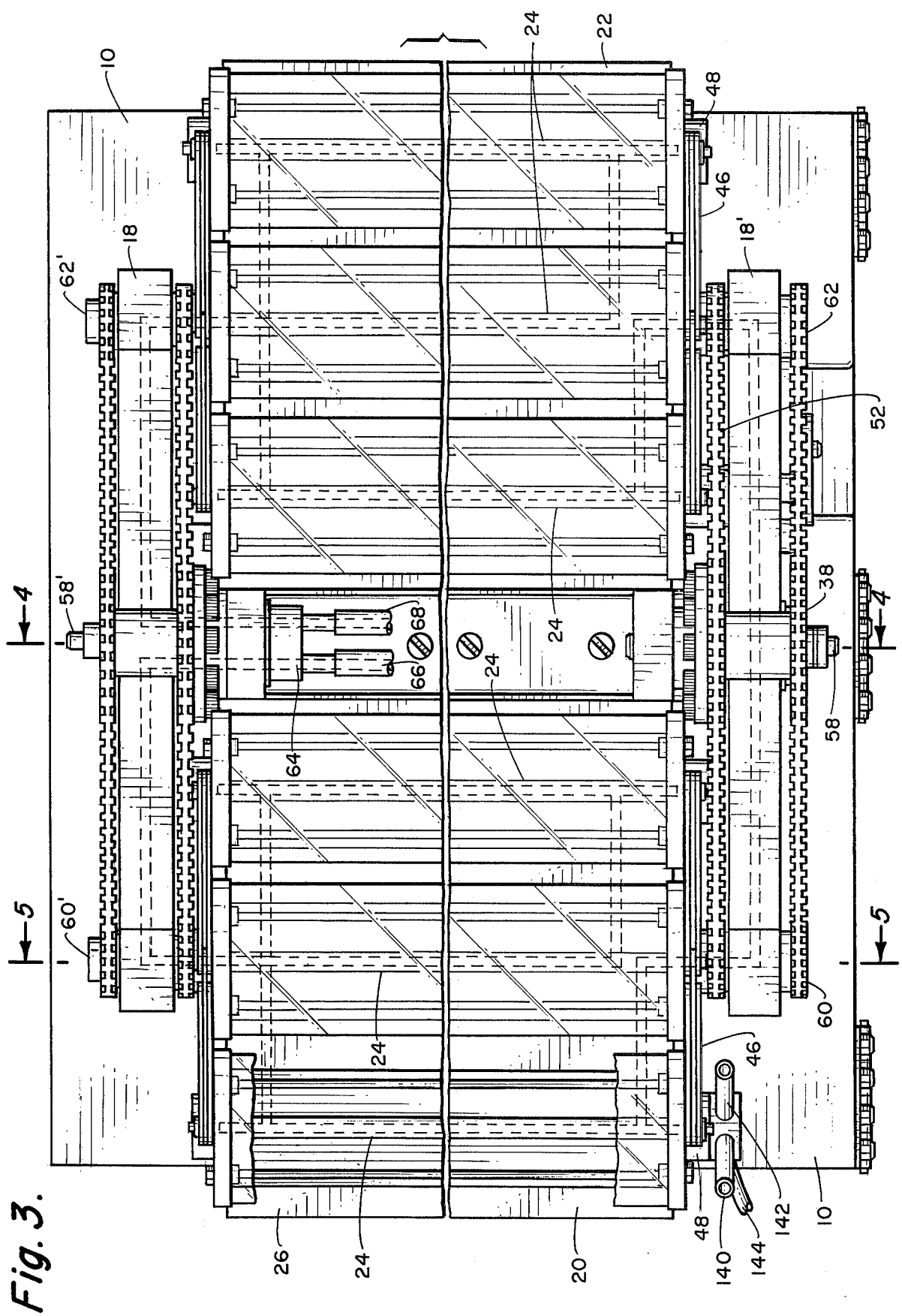
FIG. 3 is a top elevation of the solar heat collecting system taken at 3—3 of FIG. 1.

The top view of FIG. 3 illustrates the symmetry of the system in that the belt drive systems are repeated on both sides in order to provide uniform rotation and prevent any possible binding. The frames 20 and 22 are rotatably mounted on the carriage 18 by spindles 60 and 62 respectively on opposite sides of the system. Water of some other fluid for collecting heat is circulated through the system from conduits attached to a transition member 64 which delivers the fluid through the carriage 18 to the pipes or tubes 24. The fluid flows in one conduit 66 through the carriage 18 to the panel 22 through the second carriage member 18' to the carriage 22 back through the carriage 18 and out to the conduit 68. Either of conduits 66 or 68 could be the input or output.

Figure 4:
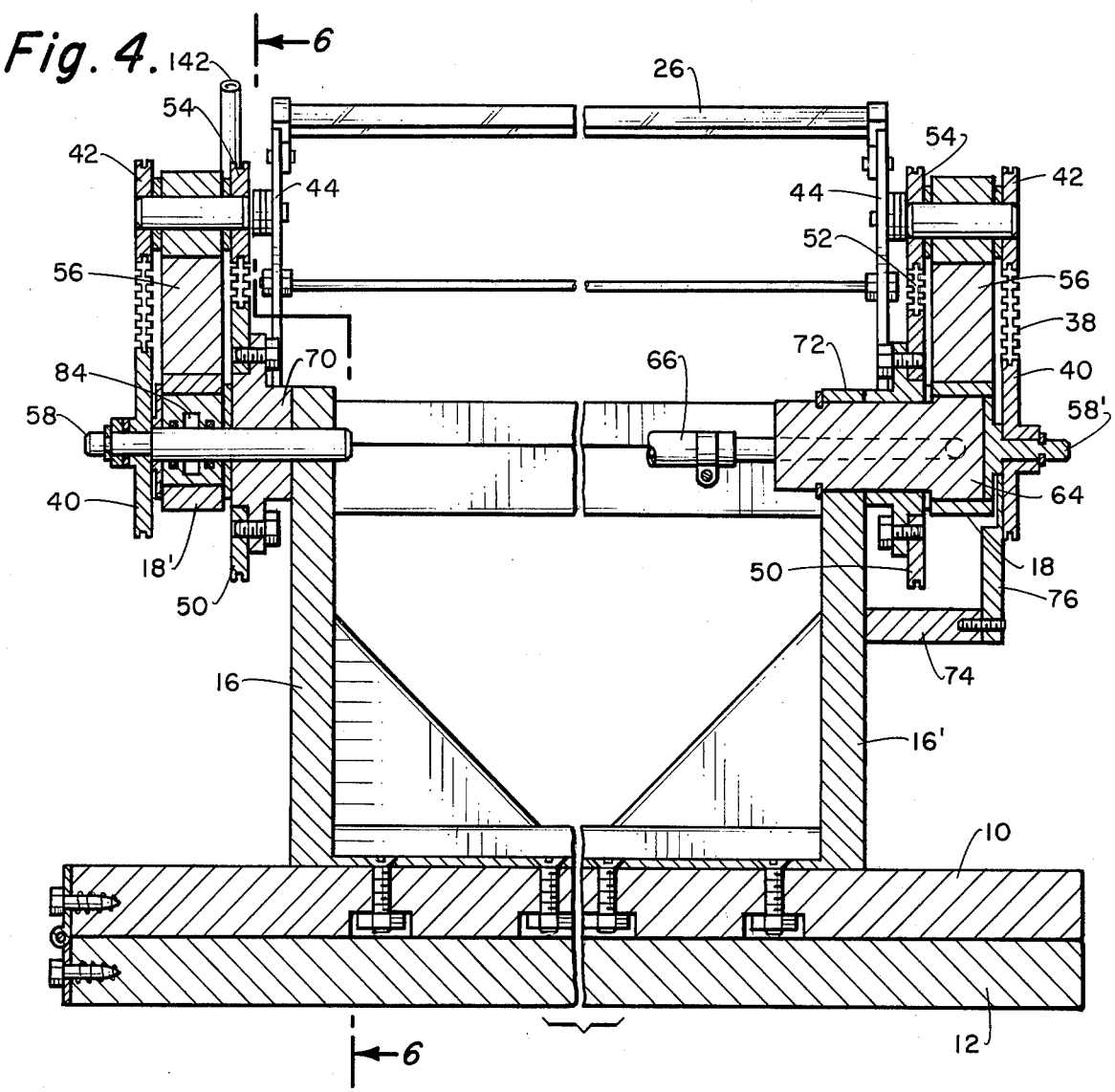
FIG. 4 is a sectional view taken at 4—4 of FIG. 3.

The mounting system for the carriage 18 and 18' and panels 20 and 22 can be seen more clearly in FIG. 4. Spindle 58 is rigidly attached to support post 16 with stationary pulley gears 40 and 50 mounted on the spindle. Stationary pulley 50 is mounted on pulley support plate 70. Carriage 18' is rotatably mounted on the spindle 58 and rotates on the spindle between the two stationary pulleys 40 and 50. The opposite side is substantially the same, except that fluid transition member 64 is attached to support post 16', with connecting conduits attached at 68 which can be flexible hoses if desired. Stationary pulley 50 is mounted on a pulley support 72 and stationary pulley 40 is mounted on spindle 58'. Members 74 and 76 provide additional support for the spindle 58'. The carriage 58 is mounted on the spindle 58' and fluid transition 64 so that it may rotate.

Figure 5:
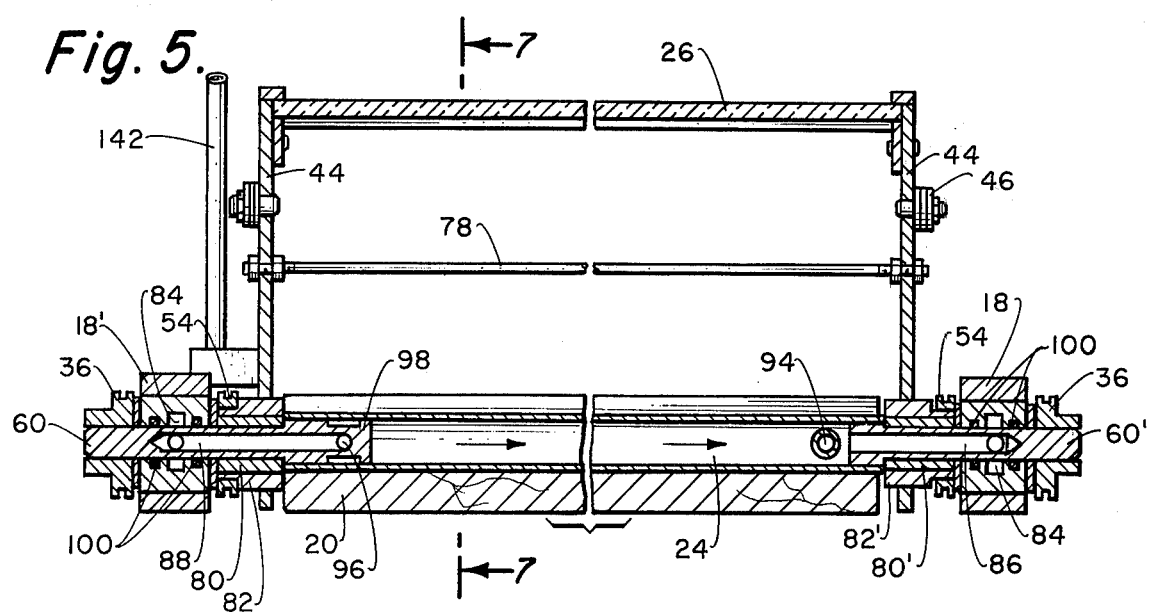
FIG. 5 is a sectional view taken at 5—5 of FIG. 3.

The lens system mounting is shown in FIG. 5, which is a sectional view taken at 5—5 of FIG. 3. The mounting of each frame or panel 20 and 22 is identical and comprises securing the panel 20 to the carriages 18 and 18' by spindles 60 and 60'. Pulleys 36 are rigidly secured to the end of the spindle 60 and 60'. The lens systems 26 mounted on support plates 44 are rotatably mounted on the spindle 60 and 60' by bushings 80 and 80' on which are mounted pulley supports 82 and 82' to which pulleys for rotating the lens 54 are attached. The pulley supports 80 and 82' are also securely welded or attached to the lens support arms 44. The bushings 80 and 80' permit the lens system to rotate independent of the panel 20.

Figure 6:
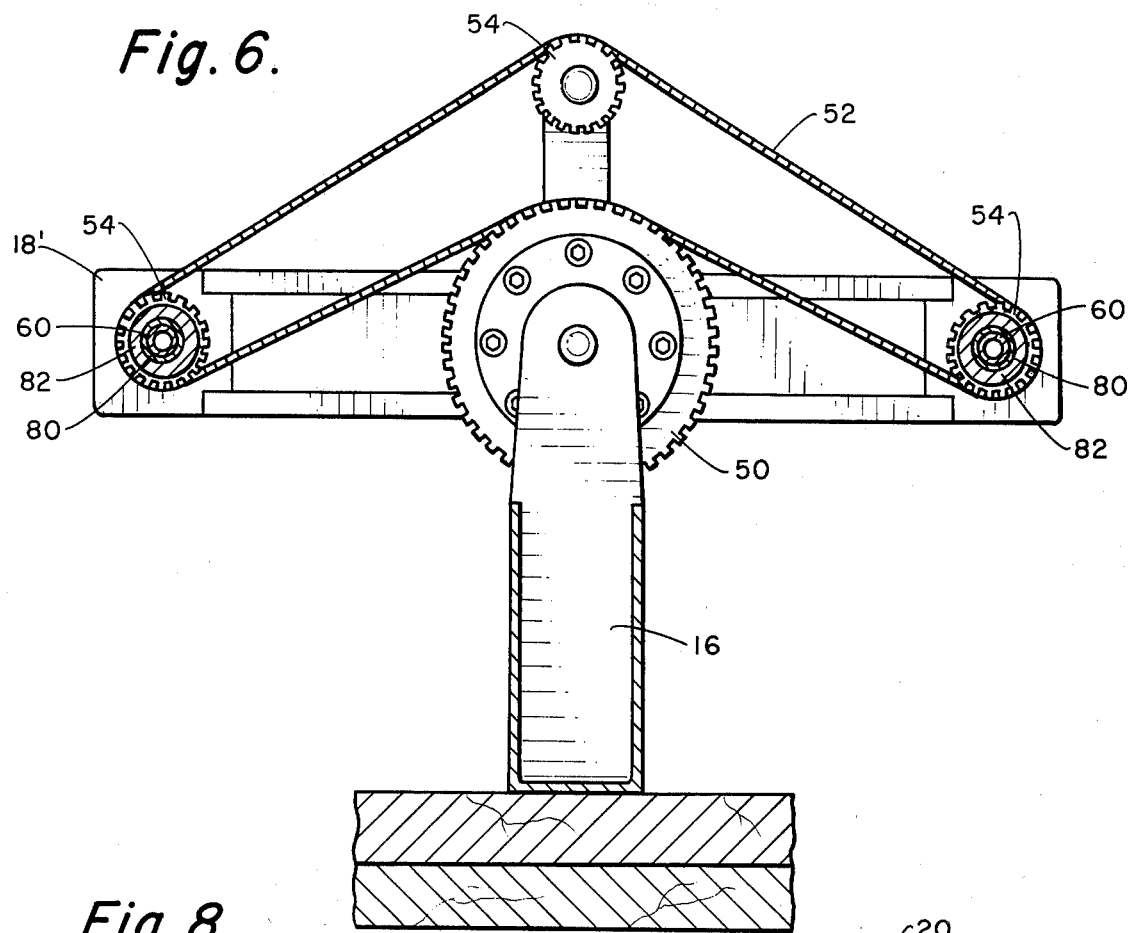
FIG. 6 is a sectional view taken at 6—6 of FIG. 4.

The drive system for rotating the lens 26 is shown in the sectional view of FIG. 6 which is taken at 6—6 of FIG. 4. The lens 26 are elongate cylinder or barrel lens which focus the solar energy on a small portion of each pipe section 24. The carriage 18' rotatably supports pulleys 54 which are mounted on pulley supports 82 rotatably supported on bushings 80 which are supported on spindle 60. The belt 52 is driven by stationary pulley gear 50 when the frame 18' is rocked either to the right or left, causing pulleys 54 to rotate which in turn rotate pulley supports 82, causing lens support arms 44 to also rotate. The rotation of lens assemblies on adjacent sides of the center lens is accomplished through the link 46 joining each lens support arm 44 on either side of the assembly.

Figure 8:
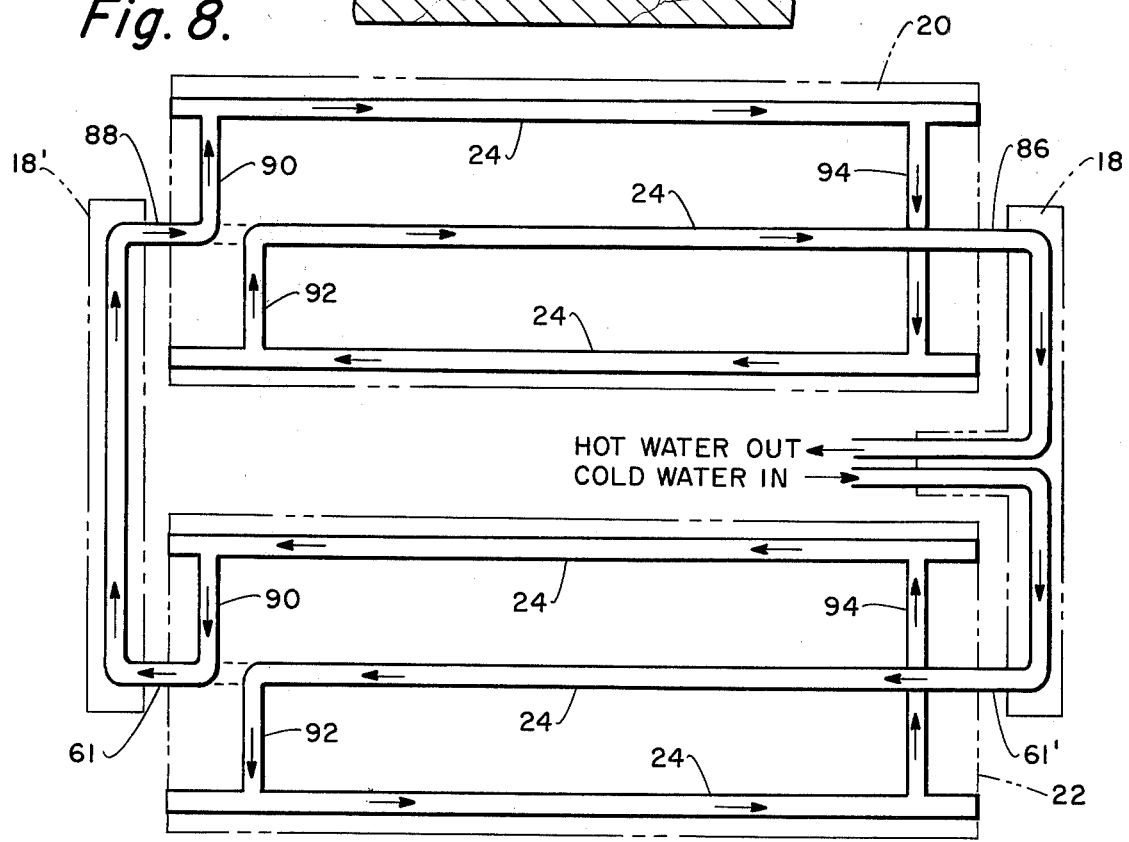
FIG. 8 is a flow diagram of the heat collecting fluid.

The fluid circulating system is illustrated in FIGS. 4, 5 and 8. The tube or pipe assembly for each frame 20 and 22 is comprised of three or more parallel sections of pipe joined to circulate the fluid through the system. The fluid, usually water, is delivered through a hose 66 to transition connector 64 and flows through carriage 18 to the tube assemblies mounted in panels or frames 20 and 22. The circulation of the fluid may be as illustrated in FIG. 8 by the arrows which show the interconnection of pipes 24 to circulate the fluid through frame or panel 22 through the opposite sides of carriage 18' then through the panel 20 back to the transition 64 through carriage 18 then to a storage tank (not shown), or some device which can utilize the heat collected in the fluid.

A passageway or tube 84 in each side of the carriage 18 carries the fluid to the frames 20 and 22 through connecting passageways in the spindles and 60' as shown in FIG. 5. Since FIG. 5 is a section view through frame 20, the water would be flowing through the tube 24 in the direction of the arrows. Thus water would flow through a passageway 84 or the left side of carriage 18' through connecting passageway 88 in spindle 60 to the tube assembly. After circulating through the tube assembly, the fluid would flow out through the center tube through connecting passageway 86 of spindle 60' to passageway 84 in the right-hand side of the carriage 18 back to the transition 64 and out.

The tube assembly can be constructed in any suitable fashion, such as welding or bending. The tube assembly schematically illustrated in FIG. 8 has three parallel tubes joined by tubes 90, 92 and 94. Connecting tubes 90 connect to a port 96 in spindle 60 (FIG. 5) which has a flange 98 to direct the flow into this tube 90. Connecting tube 94 passes through the center tube to direct the flow around the tube assembly. The flow through left and right carriage members 18 and 19' in and out of spindle 60 and 60' is sealed by O-rings 100. If desired, the flow could be varied by having the fluid flow through each tube assembly in parallel rather than circulating or heated fluid could be collected separately from each panel rather than have it circulating first through one then through the other. That is, the fluid could be introduced through both hose connections 66 and 68 and collected separately by connecting outputs to carriage 18' if desired.

In order to collect and store the maximum amount of heat produced by the solar energy various configurations for concentrating the solar energy on the tubes 24 as well as various methods for insulating the tubes to prevent loss of the heat energy collected are illustrated in FIGS. 7 and 7a through 7c. Each one of these views represents a section taken at 7—7 of FIG. 5, with a portion of the panel being shown at 20 and the barrel or cylinder lens being shown at 26. Since the solar energy is concentrated by a lens 26 on a small width along the surface of the tube 24, as illustrated by the arrows 102, a large portion of the tube 24 should be insulated to prevent heat loss through radiation. For this purpose insulation 104 is fitted over the tube assembly to substantially cover the tube, leaving only the area on which the solar energy is concentrated open. Of course, the panel or frame 20 itself would also be constructed of an insulating material which can be a plastic foam, such as polyurethane or some other type of efficient insulating material.

FIG. 7a represents a modification of the panel assembly for collecting the solar energy. In this figure the lens 126 is supported on arms 144 as before. However, the tube 124 is insulated by two elongate pieces of insulating material 120 which are secured together around the tube 124 by a plurality of clamping bolts 106. In FIG. 7b insulation is provided by a flexible plastic insulating material 108 wrapped around the tube 124 and held in place by a spring clip 110.

FIG. 7c represents an entirely different type of embodiment in which the magnifying lens 26 has been omitted. In this embodiment an envelope 112 is fabricated with an internal reflecting surface 114 with the interior of the envelope being evacuated to produce an insulating vacuum. The rear portion of the envelope 112 is shaped so that the reflecting surface 114 concentrates all the solar energy around a large portion of the tube 24 encased in the envelope 112. This reflector is known as a constant cross-section parabolic reflector. In this embodiment a larger portion of the tube 124 is radiated by the solar energy reflected from the mirrored surface 114 of the envelope 112 and heat loss is effectively prevented by the vacuum of about twenty-eight inches of mercury in the envelope.

Figure 9:
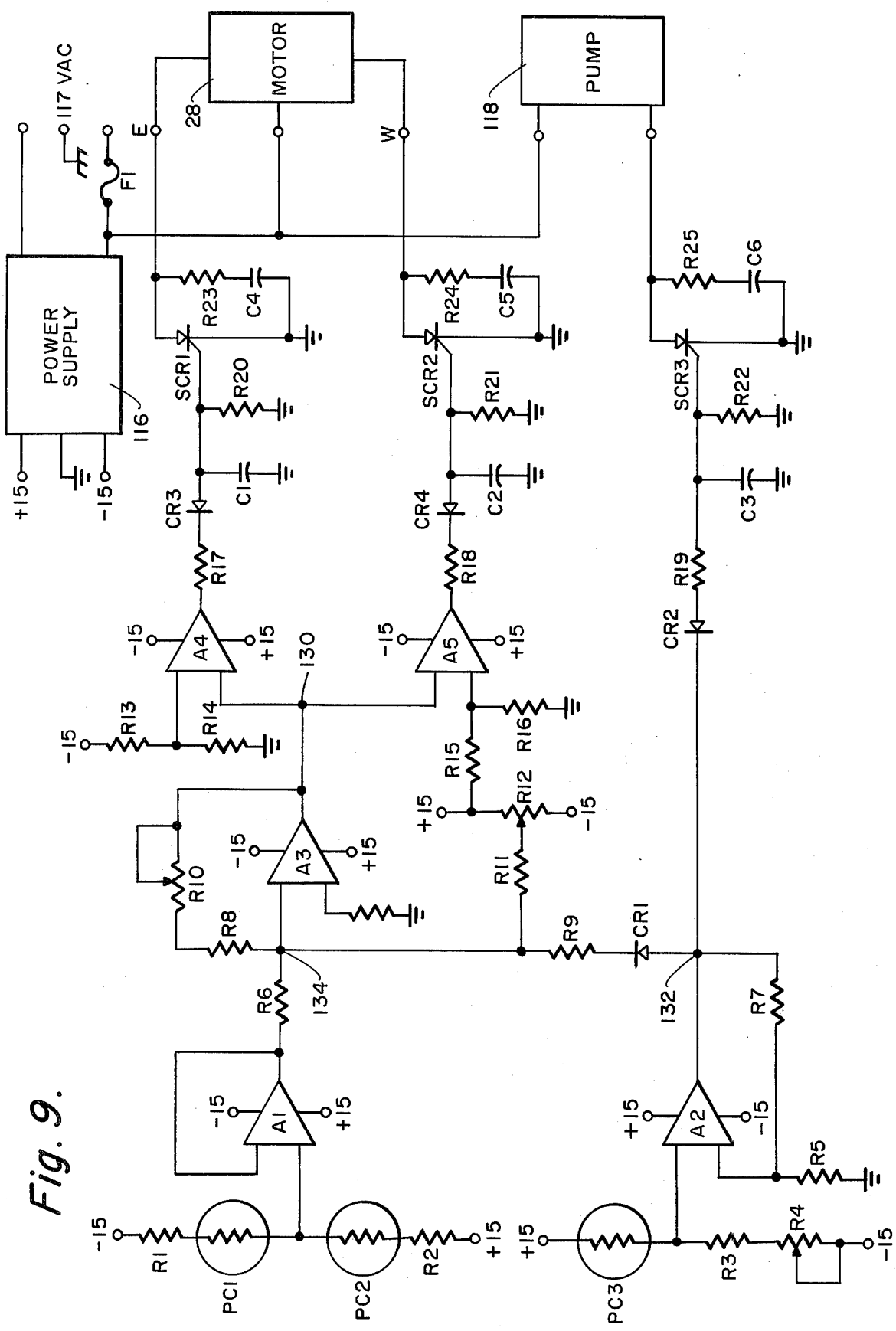
FIG. 9 is a schematic diagram of an electronic circuit for operating the solar heat collecting system.

The electronic control system for driving the motor 28 which adjusts the position of the carriage assembly 18 through a bell crank 30 and bell crank linking arm 32 is shown in FIG. 9. Power to the motor 28 and a pump 118 is controlled by the circuit shown in this schematic. The regulated power supply receives 117 volt AC input and produces a regulated ±15 volt output for circuit biasing.

This circuit is a nulling circuit which turns on motor 28 whenever there is an imbalance on photocells PC1 and PC2 appropriately mounted to receive light equally. The photocells PC1 and PC2 are common mode differential photocell sensors which provide an input to high impedance match unity gain amplifier A1 whenever there is an imbalance which in turn provides an output from system gain amplifier A3 which has its gain set by potentiometer R8. The output from amplifier A3 at 130 operates either of amplifiers A4 and A5, depending upon its polarity. 117 volts is applied to the motor 28 through fuse F1 and the motor is controlled by the grounding of terminal E or terminal W (representing east or west). The output of amplifiers A4 and A5 is applied to the gate of a Triac SCR1 or SCR2 switching either of them on, causing the motor to run one way or the other. With the gain of amplifier A3 set to produce approximately a one-volt output at 130 a +1 volt causes the motor 28 to run one way and a −1 volt causes the motor 28 to run in the opposite direction. The amplifiers A4 and A5 with their connecting output circuits operate as a differential threshold detector. With zero volts at 130 there is no voltage on the gate of the Triacs; therefore there is no drive to the motor 28.

The system is automatically turned on and off by the circuit to threshold detecting photocell PC3. This photocell determines the threshold light for turning the null circuit to the motor on and also energizes the pump 118. Potentiometer R2 provides a threshold adjustment for the input from photocell PC3 to amplifier A2. When the output at 132 is negative, Triac SCR3 is turned on simultaneously with pump 118. This occurs when the early morning light is sufficient to exceed the threshold set causing a negative output from amplifier A2. When the light diminishes below the threshold in the evening, the output at 132 of amplifier A2 becomes positive and shuts off Triac SCR3 and pump 118. At the same time, this positive signal is applied at 134 through diode CR1 producing an output from A3 at 130 which is amplified by A4 turning SCR1 on. This causes the motor to overdrive, slewing the system all the way to a position facing east.

Potentiometer R12 provides fine adjustments for centering up the assembly to correct for any tracking error. That is, any tracking error resulting from slight differences in the sensitivity of photocells PC1 or PC2 or from the mechanical assembly can be corrected by the fine adjustment of potentiometer R12 at the input to the second stage. Corrections could also be accomplished by mechanical adjustment of the photocells or assembly, if desired.

The photocells PC1 and PC2 are physically mounted for rotation with the system in order to keep the sun's rays perpendicular to the lens 26 and pipes 24. They may be mounted as shown in FIG. 1 with the photocells 140 and 142 attached to one of the lens support arms 44. The photocells 140 and 142 are mounted at the end of long tubes in order to shade them so that they will only respond to substantially direct light rays. In order to get an improved response, the tubes shading each photocell are angled slightly away from each other in the form of a V. This angle is adjusted to allow the system to operate at reasonable increments but is not sufficient to permit the device to oscillate. The larger the distance (i.e. angle) between the two photocells, then the more frequent will be adjustment to the carriage. Conversely the closer the two photocells are the less frequently the carriage will be adjusted. These two photocells are adjusted to allow the adjustment of the system when the sun's rays deviate from normal a predetermined amount, usually a few degrees.

The remaining components of the circuit can be packaged and mounted at some remote point preferably on the base and connected to the photocells via wires 144. The photocell PC3 which turn the system on in the morning and off in the evening can be mounted in any suitable position, preferably an unshaded area, but relatively close to the solar heat collecting system.

The adjustment of the base is preferably made manually because the changing of the sun's ecliptic over the seasons is actually less than 1° per day. Therefore, this adjustment can be made at periods of one week or even one month, if desired. Alternatively, a circuit such as that which is used to drive the system could be provided to adjust the base, but the adjustment is so infrequent that such a circuit is not advantageous.

While the drawings illustrate a chain sprocket or timing belt, for completing the incremental movement of the panels in relation to each other, gears could also be used. Another alternative would be to use matched displacement hydraulic cylinders and energize simultaneously with matched displacement hydraulic pumps. A screw jack would be another alternative to maintain the simultaneous movement of the three panels through the same angle, but the angle of movement in relation to ground is additive from the first panel to the lens panels. The ratio of movement between panels is held through any given angular movement. This relative movement is necessary to get the greatest area of lens exposure to the sun in relation to the base area of the solar collector system. This effectively prevents the problem of one lens shading its neighbor during the 120° tracking run.

Obviously many modifications and variations of the present invention are possible in light of the above teachings. It is therefore understood that the full scope of the invention is not limited to the details disclosed herein and may be practiced otherwise than as specifically described.

What is claimed is:

1. Apparatus for collecting heat produced by solar energy comprising:
   a base;
   a pair of legs attached to said base;
   a substantially rectangular carriage;
   axle means rotatably supporting said carriage on said legs;
   a plurality of panels rotatably supported by said carriage;
   a plurality of fluid circulating conduits supported by said panels;

focusing means for focusing the solar rays on said conduits;

rotatable means for simultaneously rotating the carriage panels and focusing means at predetermined intervals to maintain said fluid circulating conduits substantially normal to the solar rays.

2. Apparatus according to claim 1 wherein said rotating means includes:

a motor rotatably connected to said carriage;

direction detecting means for detecting the direction of solar rays and energizing said motor when the solar rays deviate from a normal position a predetermined amount.

3. Apparatus according to claim 2 wherein said direction detecting means comprises;

a null circuit adapted to energize said motor when the solar rays deviate from a normal position a predetermined amount.

4. Apparatus according to claim 3 wherein said null circuit includes:

a pair of photocells mounted on said carriage;

shading means for shading one or the other of said photocells when the solar rays deviate from normal, producing an unbalanced output from the photocells;

whereby said photocells energize the motor to rotate the carriage an amount sufficient to produce a balanced output from the photocells.

5. Apparatus according to claim 1 including:

insulating means insulating said fluid collecting conduit against loss of heat collected.

6. Apparatus according to claim 5 wherein said insulating means comprises:

insulating material substantially surrounding said conduit leaving open only the portion receiving the focused solar rays.

7. Apparatus according to claim 5 wherein said insulating means comprises:

an enclosure spaced from and surrounding said conduit; and said enclosure having a vacuum.

8. Apparatus according to claim 7 wherein said enclosure rotates simultaneously with said conduit.

9. Apparatus according to claim 8 wherein said focusing means comprises:

reflecting means circumjacent said conduit for reflecting the solar energy onto the conduit whereby the fluid is heated by the solar energy.

10. Apparatus according to claim 9 wherein said reflecting means comprises:

a reflective coating on the inside surface of said enclosure.

11. Apparatus according to claim 1 wherein said focusing means comprises:

a plurality of lens;

support means rotatably supporting each of said lens on said conduit;

whereby said rotating means simultaneously rotates said conduit and lens.

12. Apparatus according to claim 11 wherein said lens is comprised of a barrel lens.

* * * * *